United States Patent
Siehl et al.

(10) Patent No.: US 9,653,995 B2
(45) Date of Patent: May 16, 2017

(54) CONTROL DEVICE AND METHOD FOR REGULATING A MULTIPHASE DC-DC CONVERTER

(71) Applicant: Robert Bosch GmbH, Stuttgart (DE)

(72) Inventors: Patrick Siehl, Rheinau-Helmlingen (DE); Jan Gebauer, Oetigheim (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 14/437,263

(22) PCT Filed: Sep. 4, 2013

(86) PCT No.: PCT/EP2013/068214
§ 371 (c)(1),
(2) Date: Apr. 21, 2015

(87) PCT Pub. No.: WO2014/063855
PCT Pub. Date: May 1, 2014

(65) Prior Publication Data
US 2015/0280564 A1    Oct. 1, 2015

(30) Foreign Application Priority Data
Oct. 24, 2012 (DE) .......................... 10 2012 219 385

(51) Int. Cl.
 *H02M 3/158* (2006.01)
 *G05F 1/56* (2006.01)
 *H02M 1/00* (2006.01)

(52) U.S. Cl.
CPC .............. *H02M 3/158* (2013.01); *G05F 1/56* (2013.01); *H02M 3/1584* (2013.01); *H02M 2001/0025* (2013.01); *H02M 2003/1586* (2013.01)

(58) Field of Classification Search
CPC .................................................. H02M 3/158
(Continued)

(56) References Cited

U.S. PATENT DOCUMENTS 5,734,259 A * 3/1998 Sisson ................ H02M 3/1563
                                                                323/282
7,522,436 B2    4/2009 Schultz et al.
(Continued)

FOREIGN PATENT DOCUMENTS

AT         405584      9/1999
EP        1700371      6/2006

OTHER PUBLICATIONS

Schellekens et al., "Interleaved switching of parallel ZVS hysteresis current controlled inverters," 2010 International Power Electronics Conference, IPEC-Sapporo 2010, Jun. 21, 2010, pp. 2822-2829.
Batchvarov et al., "Interleaved converters based on hysteresis current control," Power Electronics Specialists Conference, 2000, Pesc 00, 2000 IEEE 31st Annual Jun. 18-23, 2000, vol. 2, Jun. 18, 2000, pp. 655-661.
International Search Report for Application No. PCT/EP2013/068214 dated Dec. 9, 2014 (English Translation, 3 pages).

*Primary Examiner* — Jue Zhang
*Assistant Examiner* — Trinh Dang
(74) *Attorney, Agent, or Firm* — Michael Best & Friedrich LLP

(57) ABSTRACT

The invention relates to a control device for regulating a multiphase dc-dc converter having at least one first converter branch and one second converter branch connected in parallel to the first converter branch. The control device comprises a switching signal generation device that is designed to determine measurement values for the current in the converter branches, to compare, for a first of the converter branches, the determined measurement value of the current in the first converter branch to a first upper threshold current value and a first lower threshold current value and, on the basis of the comparisons, to generate a first control (Continued)

signal for switching devices of the first converter branch, and for a second of the converter branches, to compare the determined measurement value of the current in the second converter branch to a second upper threshold current value and a second lower threshold current value and, on the basis of the comparisons, to generate a second control signal for switching devices of the second converter branch. The control device further comprises a threshold value generator, which is coupled to the switching signal generation device and is designed to generate upper and lower threshold current values for the switching signal generation device, to determine an actual current phase offset of the control signals for the switching devices in the first and second converter branches, and on the basis of the determined phase offset, to temporarily modify the second upper current threshold value and/or the second lower current threshold value.

8 Claims, 3 Drawing Sheets

(58) Field of Classification Search
USPC .......................................................... 323/271
See application file for complete search history.

(56) References Cited

U.S. PATENT DOCUMENTS

| 2008/0067993 | A1* | 3/2008 | Coleman ................. H02M 1/08 323/282 |
| 2009/0051335 | A1* | 2/2009 | Huang .................. H02M 3/157 323/268 |
| 2010/0109713 | A1* | 5/2010 | Harriman ............ H02M 3/1584 327/103 |
| 2010/0320983 | A1* | 12/2010 | Wu ...................... H02M 3/1584 323/283 |
| 2011/0316497 | A1 | 12/2011 | Sardat et al. |

\* cited by examiner

CONTROL DEVICE AND METHOD FOR REGULATING A MULTIPHASE DC-DC CONVERTER

BACKGROUND OF THE INVENTION

The invention relates to a control device and to a method for controlling a polyphase DC-to-DC voltage converter, in particular using a phase-shift interleaved control.

DC-to-DC voltage converters, that is to say converters which convert a DC input voltage into a DC output voltage, are often driven using current hysteresis control. For this purpose, the current, for example in an inductor of the DC-to-DC voltage converter, is controlled using a three-state controller. In this case, voltage is applied to the inductors at intervals if the inductor current drops below a first threshold value and voltage is taken from the inductor if the current rises above a second threshold value. As a result, the current in the inductor can always be kept within the current value range defined by the first and second threshold value, and the output voltage of the DC-to-DC voltage converter can be controlled.

DC-to-DC voltage converters are often designed to be polyphase. In this case, the total output voltage of the DC-to-DC voltage converter is composed of the two output voltages of the parallel-connected converter branches. In order to reduce the current ripple of the input current and the voltage ripple of the total output voltage, a phase-shift interleaved actuation ("interleaved control") can be used. In this case, the individual converter branches are actuated with a phase shift.

By means of said actuation, it is possible for the current ripple or voltage ripple of the individual converter branches to mutually cancel out, that is to say negatively interfere, and hence reduce the total current or voltage ripple. This leads to lower loadings in voltage source and load and to reduced implementation expenditure and more cost-efficient configuration of filtering devices within the converter.

In order to quickly achieve an optimum phase shift between the converter branches or after achieving it, keeping it at precise as possible, it is necessary to take measures to be able to control and regulate the phase shift between the converter branches.

The document Schellekens, J. M. et al.: "Interleaved Switching of Parallel ZVS Hysteresis Current Controlled Inverters", The 2010 International Power Electronics Conference, IEEE, 21-24 Jun. 2010, pp 2822-2829 discloses a method for current hysteresis control for DC-to-DC voltage converters which is based on the generation of threshold value ramps for generating a phase shift.

The document U.S. Pat. No. 7,522,436 B2 discloses a DC-to-DC voltage converter with parallel-connected phases which are actuated in a master-slave mode. In this case, firstly, a master phase is determined and, for the slave phases, a ramp function is calculated for the upper current threshold value, which ramp function implements a particular linear variation of the upper current threshold value over a switching cycle.

There is therefore a need for possibilities for generating and permanently reliably maintaining a phase shift in converter branches, which are controlled using an interleaved controller, of a polyphase DC-to-DC voltage converter in a simple, flexible, reliable and quickly reacting manner.

SUMMARY OF THE INVENTION

According to one aspect, the present invention provides a method for controlling a polyphase DC-to-DC voltage converter which has at least one first converter branch and a second converter branch connected in parallel with the first converter branch, having the steps of calculating measured values for the current in the converter branches, generating upper and lower current threshold values, comparing the calculated measured value of the current in the first converter branch to a first upper current threshold value and a first lower current threshold value, generating, on the basis of the comparison, a first actuation signal for switching devices of the first converter branch, comparing the calculated measured value of the current in the second converter branch to a second upper current threshold value and a second lower current threshold value, generating, on the basis of the comparison, a second actuation signal for switching devices of the second converter branch, calculating a present phase shift of the actuation signals for the switching devices in the first and second converter branches, and temporarily changing the second upper current threshold value and/or the second lower current threshold value on the basis of the calculated phase shift.

According to another aspect, the present invention provides a control device for controlling a polyphase DC-to-DC voltage converter which has at least one first converter branch and a second converter branch connected in parallel with the first converter branch. The control device has a switching signal generating device which is designed to calculate measured values for the current in the converter branches, compare, for a first one of the converter branches, the calculated measured value of the current in the first converter branch to a first upper current threshold value and a first lower current threshold value and to generate, on the basis of the comparison, a first actuation signal for switching devices of the first converter branch, and compare, for a second one of the converter branches, the calculated measured value of the current in the second converter branch to a second upper current threshold value and a second lower current threshold value and to generate, on the basis of the comparison, a second actuation signal for switching devices of the second converter branch. Furthermore, the control device has a threshold-value generator which is coupled to the switching signal generating device and which is designed to generate upper and lower current threshold values for the switching signal generating device, calculate a present phase shift of the actuation signals for the switching devices in the first and second converter branches, and temporarily change the second upper current threshold value and/or the second lower current threshold value on the basis of the calculated phase shift.

According to another aspect, the present invention provides a DC-to-DC voltage converter system, having a DC-to-DC voltage converter having at least one first converter branch and a second converter branch connected in parallel with the first converter branch, and a control device according to the invention, which is designed to control the DC-to-DC voltage converter.

The concept of the present invention is to provide current hysteresis control for a polyphase DC-to-DC voltage converter with greater flexibility and accuracy. In this case, the hysteresis width of the current hysteresis control, that is to say the length of the actuation periods, is temporarily varied in a targeted manner in order to be able to set the switching times of the individual phases of the DC-to-DC voltage converter according to a desired time shift. Once the switching times of the individual phases of the DC-to-DC voltage converter have the desired target shift, the lengths of the actuation periods can be matched to one another again. The temporary variation of the actuation periods is done in this case by temporarily raising or lowering of current threshold values for currents of the converter phases, on the basis of which the converter phases are switched.

An advantage of the actuation according to the invention is that, in particular during operation of the DC-to-DC voltage converter, it is possible to react quickly and flexibly to changed boundary conditions such as disconnection or connection of individual converter branches or phases. In addition, in the event of a failure of converter branches, the actuation can be rapidly adapted to the changed number of phases. The degrees of freedom in the case of the adaptation of the phase shifts to the time shifts are significantly higher with the actuation according to the invention.

Moreover, there is the advantage that, in particular in the case of DC-to-DC voltage converters with large input and/or output voltage ranges, it is possible to react rapidly to modified operating conditions. By way of example, by changing the current threshold values, it is possible to quickly and flexibly realize disconnection or connection of phases in partial-load ranges.

The actuation according to the invention can be implemented in a simple and cost-effective manner using common smart switching components, such as FPGAs or ASICs, for example.

According to an embodiment of the control device according to the invention, the upper and lower current threshold values may have constant predefinable values, and wherein the threshold value generator is designed to keep the constant values of the second upper current threshold value and/or of the second lower current threshold value changed until the calculated phase shift has reached a predefinable target shift. This enables quick switchovers between different values for the threshold values, as a result of which complicated digital circuits, for example for generating threshold value ramps, are avoided. In particular at high switching frequencies, for example in the range above 30 kHz, this procedure can make the actuation circuit more efficient, quicker, more energy-saving and easier to implement. In particular, the expenditure in terms of analog circuitry is significantly reduced as a result.

According to another embodiment of the control device according to the invention, the control device may also comprise a driver device which is coupled to the switching signal generating device and which is designed to generate, on the basis of the first and second actuation signals, driver signals for the switching devices of the first and second converter branches.

According to another embodiment of the control device according to the invention, the first and second converter branches may comprise boost converters, buck converters, synchronous converters, buck-boost converters, SEPIC converters, Ćuk converters or zeta converters.

According to another embodiment of the control device according to the invention, the switching signal generating device may have first and second comparator logic devices which are designed to compare the measured values of the current in the converter branches with the upper and lower threshold value signals and to output corresponding comparison signals, and first and second flip-flops (for example SR flip-flops) which are coupled to the first and second comparator logic devices and which generate the first and second actuation signals on the basis of the comparison signals. This circuit is simple to implement and can advantageously cause the target shift of the phase shift for the interleaved actuation to be achieved within a few pulse periods.

According to another embodiment of the control device according to the invention, the threshold value generator may have a time-shift calculating device which is coupled to the flip-flops and which is designed to calculate the switching times of the flip-flops and a phase shift between the switching times of the flip-flops, and a threshold-value controller which is coupled to the time-shift calculating device and which controls the change in the second upper current threshold value and/or in the second lower current threshold value on the basis of the calculated phase shift of the time-shift calculating device. This affords the advantage that simple, cost-effective and quick ASICs or FPGAs can be used for the respective components in the threshold-value generator.

According to another embodiment of the control device according to the invention, the threshold-value controller may implement any control algorithm, for example a three-state controller, PI controller, PID controller or a fuzzy controller. This enables the variable configuration of the threshold-value generator depending on desired speed, reliability or accuracy.

According to another embodiment of the method according to the invention, the upper and lower current threshold values can have constant predefinable values, and wherein the temporary change involves keeping the constant values of the second upper current threshold value and/or of the second lower current threshold value at the changed value until the calculated phase shift has reached a predefinable target shift. This enables quick switchovers between different values for the threshold values, as a result of which complicated digital circuits, for example for generating threshold value ramps, are avoided. In particular at high switching frequencies, for example in the range above 30 kHz, this procedure can make the actuation circuit more efficient, quicker, more energy-saving and easier to implement. In particular, the expenditure in terms of analog circuitry is significantly reduced as a result.

BRIEF DESCRIPTION OF THE DRAWINGS

Further features and advantages of embodiments of the invention emerge from the following description with reference to the appended drawings.

In the drawings.

DETAILED DESCRIPTION

Figure 1:
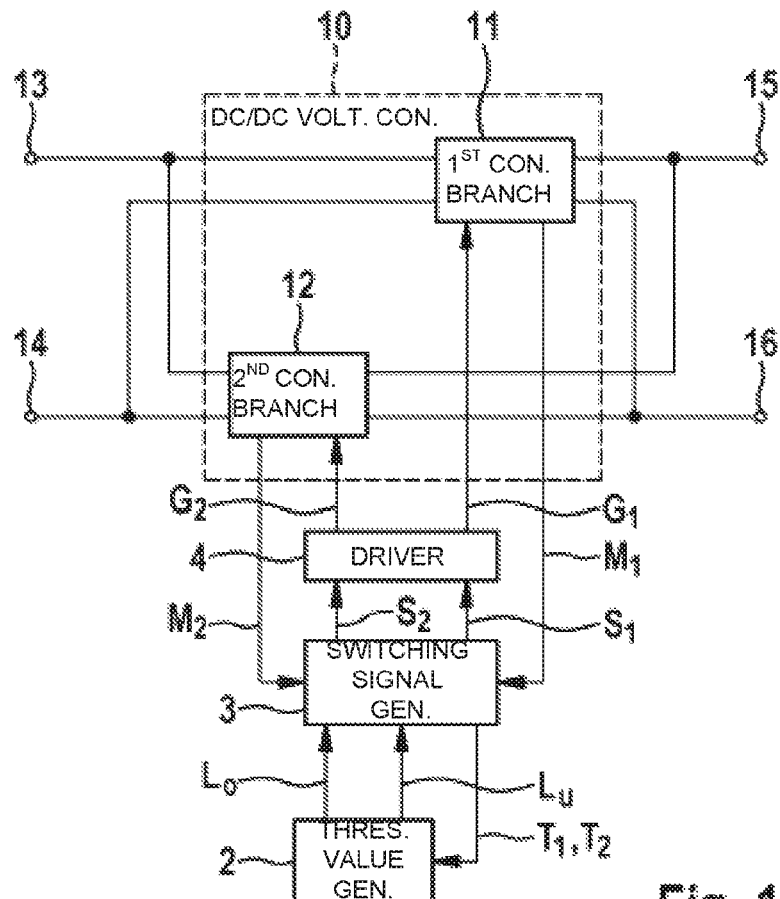
FIG. 1 shows a schematic illustration of a DC-to-DC voltage converter system according to an embodiment of the present invention.

FIG. 1 shows a DC-to-DC voltage converter system having a DC-to-DC voltage converter 10 with at least one first converter branch 11 and a second converter branch 12 which is connected in parallel with the first converter branch 11. The two converter branches 11 and 12 are connected via a corresponding DC voltage inputs 13 and 14 to an input voltage source. A total output voltage of the DC-to-DC voltage converter 10 can then be made available via DC voltage outputs 15 and 16. The total output voltage of the DC-to-DC voltage converter 10 corresponds in this case to the branch voltages available at the respective converter branches 11 and 12. The DC-to-DC voltage converter system also comprises a control device which is designed to control the DC-to-DC voltage converter 10 and, in particular, the individual converter branches.

Figure 2:
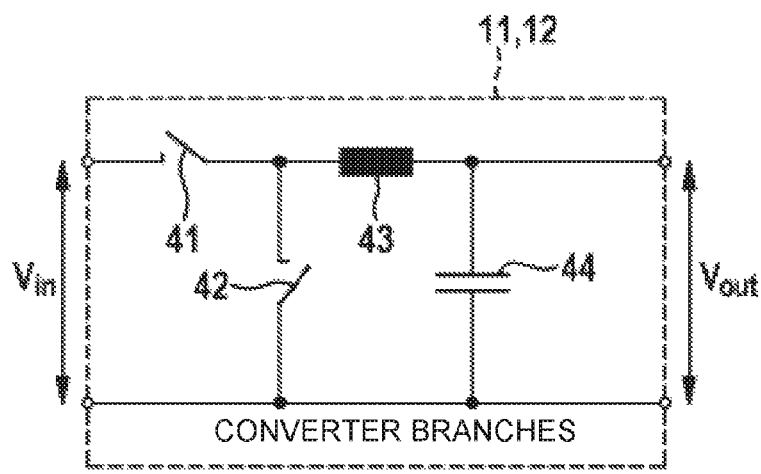
FIG. 2 shows a schematic illustration of an exemplary embodiment of a converter branch of the DC-to-DC voltage converter according to FIG. 1.

An exemplary possible configuration of the converter branches 11 and 12 is shown in FIG. 2, in which possible configuration the converter branches 11 and 12 have synchronous converters. The synchronous converters have a half-bridge composed of active switching devices 41 and 42, for example power semiconductor switches such as MOSFETs, JFETs, IGBTs or BJTs, a storage inductor 43 and an intermediate circuit capacitor 44. The synchronous converters can convert an input voltage $V_{in}$ into a desired output voltage $V_{out}$ by corresponding complementary actuation of the switching devices 41 and 42.

However, instead of the synchronous converters shown by way of example in FIG. 2, other converter topologies may also be used in the converter branches 11 and 12, for example boost converters, buck converters, buck-boost converters, SEPIC converters, Ćuk converters or zeta converters. In addition, the number of converter branches 11 and 12 is not limited to two: in the DC-to-DC voltage converter 10, three or more converter branches may also be implemented. The general principle applies that with increasing number of converter branches, the amplitudes of the current or voltage ripple decrease, since the interleaved control enables a finer mutual gradation of the converter branches.

With reference to FIG. 1, the control device for controlling the polyphase DC-to-DC voltage converter 10 comprises a switching signal generating device 3 and a threshold-value generator 2, which is coupled to the switching signal generating device 3. In addition, the control device may have a driver device 4, which is coupled to the switching signal generating device 3.

Figure 4:
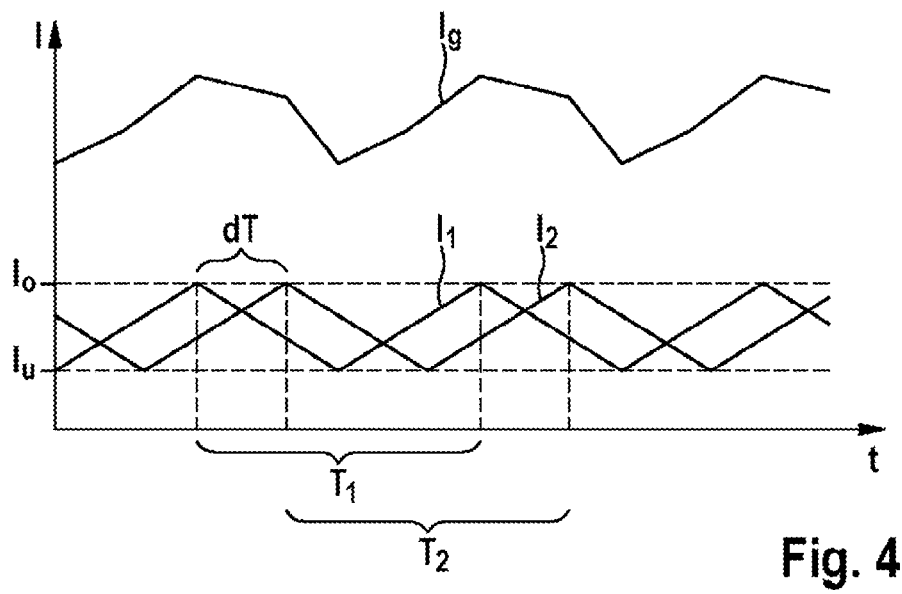
FIG. 4 shows a schematic illustration of a current-time graph for the actuation of the converter branches of a DC-to-DC voltage converter according to another embodiment of the present invention.

The switching signal generating device 3 is designed to calculate measured values for the current in the converter branches 11 and 12, in particular in a storage inductor 43 of the converter branches. Said currents are illustrated by way of example in the current-time graph in FIG. 4. In this case, $I_1$ corresponds to the current in the first converter branch 11 and $I_2$ corresponds to the current in the second converter branch 12. The actuation of the switching devices 41 and 42 in the converter branches 11 and 12 is done in this case using current hysteresis control, that is to say once the current in the storage inductor 43 drops below a lower current threshold $I_u$, the switching devices 41 and 42 are triggered such that the input voltage $V_{in}$ is present across the storage inductor 43. As a result, the current in the storage inductor 43 increases continuously until it exceeds the upper current threshold $I_o$. This causes the switching devices 41 and 42 to trigger in order to remove the input voltage $V_{in}$ from the input of the storage inductor 43, as a result of which the current in the storage inductor 43 continuously decreases again. This actuation therefore takes place periodically with an actuation period $T_1$ or $T_2$.

As a result of identical current thresholds $I_o$ and $I_u$ for the two converter branches 11 and 12, a phase shift dT between the actuation phases that remains the same arises. This phase shift causes a reduction in the current ripples, as illustrated by way of example in FIG. 4, in the total output current $I_g$. The current ripples are in particular then at a minimum if the phase shift dT corresponds to a target shift dT' which is dependent on the number of converter branches. For n converter branches and a constant actuation period T for all of the converter branches, this target shift dT'=T/n. Usually, a main converter branch, the so-called master phase, is selected from the converter branches, the actuation period T of which main converter branch guides the remaining converter branches, the so-called slave phases. For optimum temporal shift, for the kth phase after the master phase, $dt_k$=k*dT, wherein k=0 is defined for the master phase.

Figure 5:
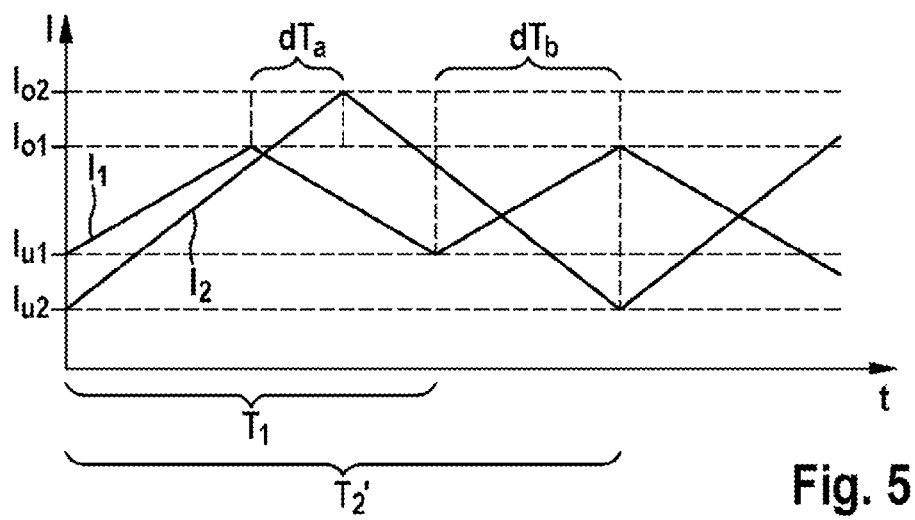
FIG. 5 shows a schematic illustration of a current-time graph for the actuation of the converter branches of a DC-to-DC voltage converter according to another embodiment of the present invention.

FIG. 5 shows a schematic illustration of a current-time graph of the actuation of the converter branches of a DC-to-DC voltage converter, for example the DC-to-DC voltage converter 10 in FIG. 1. In this case, the upper and lower current thresholds $I_{o1}$ and $I_{u1}$ are set for a first converter branch 11, while upper and lower current thresholds $I_{o2}$ and $I_{u2}$ which differ from those for the first converter branch are set for the second converter branch 12. In the example in FIG. 5, the upper and lower current thresholds $I_{o2}$ and $I_{u2}$ are respectively raised and lowered compared to the upper and lower current thresholds $I_{o1}$ and $I_{u1}$. Accordingly, a lower value emerges for the actuation period $T_1$ for the first converter branch 11 than for the new actuation period $T_2'$ for the second converter branch 12.

This leads firstly to a phase shift $dT_a$ existing between the two actuations for the first and second converter branch, the value of which phase shift is already increased after a short time to $dT_b$, however. In the example in FIG. 5, the deviations for the upper and lower current thresholds $I_{o2}$ and $I_{u2}$ are illustrated in an exaggeratedly large fashion for reasons of clarity and changes to the upper and lower current thresholds $I_{o2}$ and $I_{u2}$, compared to the upper and lower current thresholds $I_{o1}$ and $I_{u1}$, can be selected, which are substantially smaller, for example fewer per mille to fewer percent than the values of the upper and lower current thresholds $I_{o1}$ and $I_{u1}$. The smaller the selected changes to the upper and lower current thresholds $I_{o2}$ and $I_{u2}$, the slower the phase shift between the two actuation phases for the converter branches 11 and 12 changes.

The switching signal generating device 3 benefits from the situation shown in FIG. 5 by being designed to compare, for a first one of the converter branches 11, the calculated measured value $M_1$ of the current $I_1$ in the first converter branch 11 with a first upper current threshold value $L_{o1}$ and a first lower current threshold value $L_{u1}$ and, on the basis of the comparison, to generate a first actuation signal $S_1$ for switching devices of the first converter branch 11. Similarly, the switching signal generating device 3 can be designed to compare, for a second one of the converter branches 12, the calculated measured value $M_2$ of the current $I_2$ in the second converter branch 12 with a second upper current threshold value $L_{o2}$ and a second lower current threshold value $L_{u2}$ and, on the basis of the comparison, to generate a second actuation signal $S_2$ for switching devices of the second converter branch 12.

The control device comprises a threshold-value generator 2 for variably setting the current threshold values, which threshold-value generator is designed to generate upper and lower current threshold values $L_{o1}$, $L_{u1}$; $L_{o2}$, $L_{u2}$ for the switching signal generating device 3. Said current threshold values are generated by the threshold-value generator 2 on the basis of a present phase shift dT of the actuation signals $S_1$; $S_2$ for the switching devices in the first and second converter branches 11 and 12, which threshold-value generator can then temporarily change the second upper current threshold value $L_{o2}$ and/or the second lower current threshold value $L_{u2}$ on the basis of the calculated phase shift dT.

The first and second actuation signals $S_1$; $S_2$ generated by the switching signal generating device 3 are transferred to the driver device 4 which is then designed to generate, on the basis of the actuation signals $S_1$; $S_2$, driver signals $G_1$; $G_2$ for the switching devices of the first and second converter branches 11 and 12, for example control signals for the gate connections of power semiconductor switches.

Figure 3:
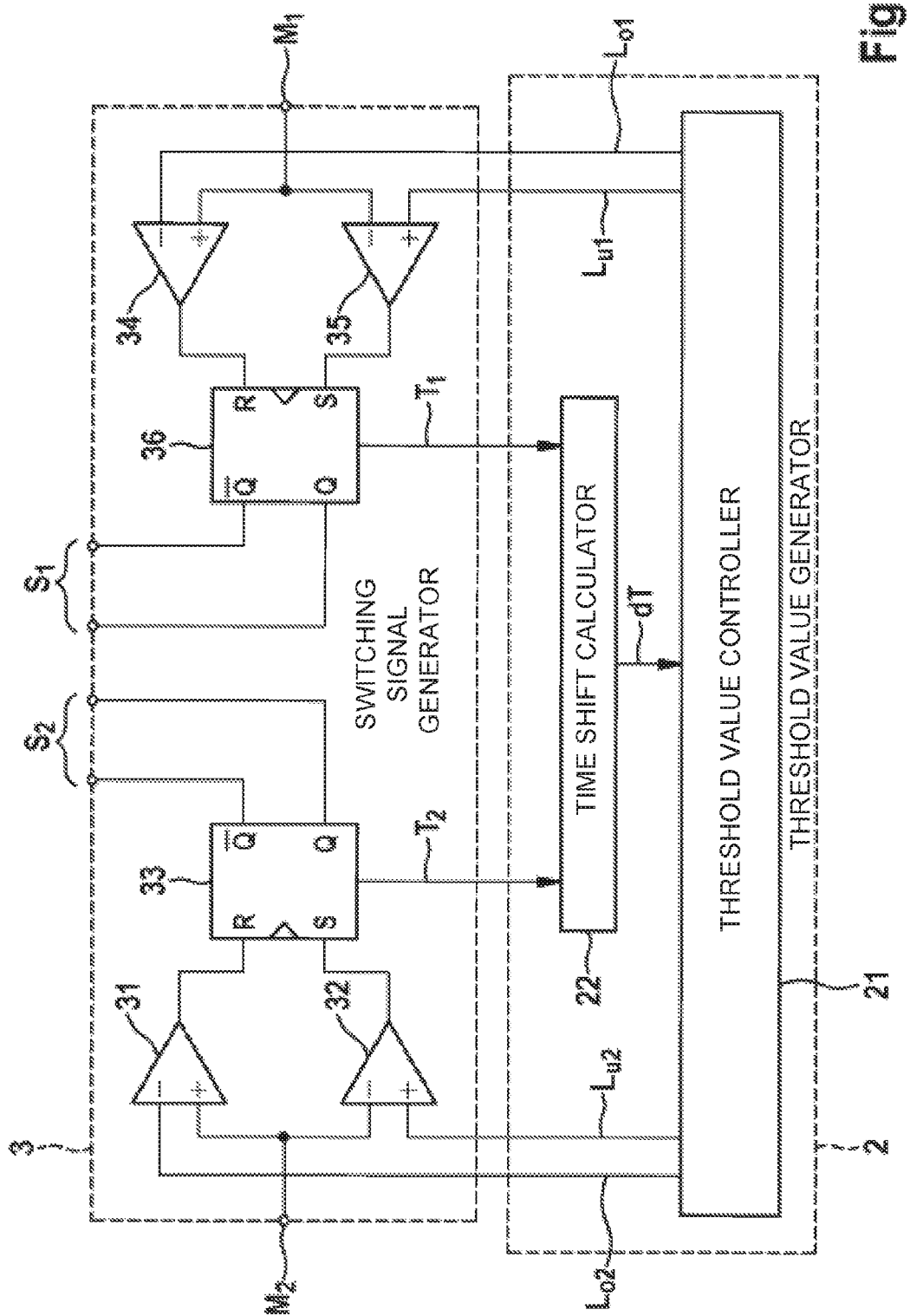
FIG. 3 shows a schematic illustration of an exemplary embodiment of a control device of the DC-to-DC voltage converter system according to FIG. 1.

FIG. 3 shows an exemplary configuration of the switching signal generating device 3 and the threshold-value generator 2. The switching signal generating device 3 has first and second comparator logic devices 31, 32 or 34, 35, in each case for one of the converter branches 11 and 12. The comparator logic devices 31, 32 or 34, 35 are designed to compare the measured values $M_1$ or $M_2$ of the current $I_1$ or $I_2$ in the converter branches 11 or 12 with the upper and lower threshold value signals $L_{o1}$, $L_{u1}$ or $L_{o2}$, $L_{u2}$ and to output corresponding comparison signals. Said comparison signals are fed to first and second flip-flops 33 or 36, with the result that the first and second actuation signals $S_1$ and $S_2$ can be generated on the basis of the comparison signals. By way of example, the first and second actuation signals $S_1$ and $S_2$ in FIG. 3 have two complementary components which are used, for example, for the actuation of the switching devices 41 and 42 of the synchronous converter in FIG. 2. Of course, the type of the actuation signals $S_1$ and $S_2$ can be adapted to the respective converter topology of the converter branches 11 and 12. The flip-flops shown in FIG. 3 are illustrated by way of example as SR flip-flops, wherein other flip-flop types can also be used, however.

The threshold-value generator 2 in FIG. 3 has a time-shift calculating device 22 which is coupled to the flip-flops 33 and 36 and which is designed to receive the switching times $T_1$ and $T_2$ of the flip-flops 33 and 36. From said switching times, the time-shift calculating device 22 can calculate a present phase shift dT between the switching times $T_1$ and $T_2$ of the flip-flops 33 and 36, which phase shift is then output to a threshold-value controller 21 which is coupled to the time-shift calculating device 22. The threshold-value controller 21—for example a three-state controller, a PI controller, a PID controller or a fuzzy controller—may be designed to control the change in the second upper current threshold value $L_{o2}$ and/or of the second lower current threshold value $L_{u2}$ on the basis of the calculated phase shift dT of the time-shift calculating device 22. In particular, in the event of a deviation of the present phase shift dT from a target shift, one or both of the current threshold values $L_{o2}$ and $L_{u2}$ are temporarily varied such that the phase shift dT in the temporal profile of the actuation approaches the target shift again. In the case of more than two converter branches, the threshold-value controller 21 can perform a corresponding temporary change of the current threshold values for each of the converter branches. As a result, it is possible to adapt the phase shift for each of the converter phases to the desired target shift within a few switching periods.

Figure 6:
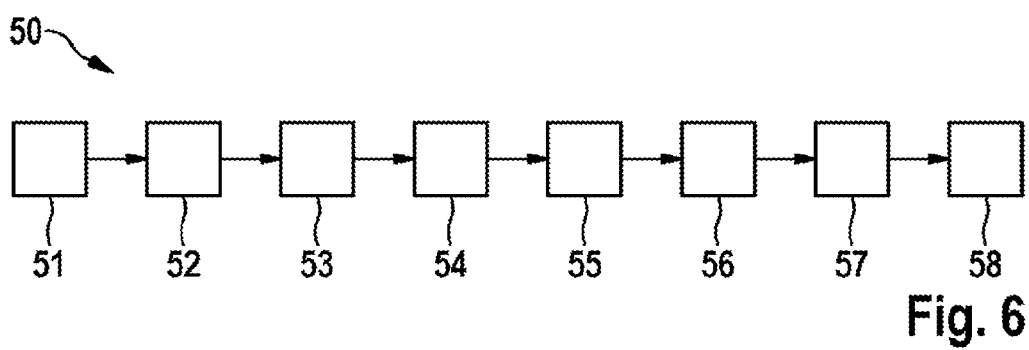
FIG. 6 shows a schematic illustration of a method for controlling a polyphase DC-to-DC voltage converter according to another embodiment of the present invention.

FIG. 6 shows a schematic illustration of a method 50 for controlling a polyphase DC-to-DC voltage converter which has at least one first converter branch and a second converter branch connected in parallel with the first converter branch. By way of example, the method can be used to control a polyphase DC-to-DC voltage converter 10 shown and explained in conjunction with FIGS. 1 to 5. By way of example, the method 50 can be implemented using the control device shown in FIGS. 1 and 3.

In a first step 51, the method 50 can comprise calculating measured values for the current in the converter branches. In a second step 52, upper and lower current threshold values are generated. In a third step 53, the calculated measured value of the current in the first converter branch is compared with a first upper threshold value signal and a first lower threshold value signal. On the basis of the comparison, a first actuation signal for switching devices of the first converter branch is generated in a fourth step 54.

In parallel with the steps 53 and 54, a corresponding comparison of the calculated measured value of the current in the second converter branch with a second upper threshold value signal and a second lower threshold value signal and, on the basis of the comparison, generation of a second actuation signal for switching devices of the second converter branch, can take place in steps 55 and 56. Subsequently, in step 57, a present phase shift of the actuation signals for the switching devices in the first and second converter branches is calculated. Then, in step 58, the second upper current threshold value and/or the second lower current threshold value are temporarily changed on the basis of the calculated phase shift.

In this case, the upper and lower current threshold values can have constant predefinable values. The temporary change in the constant values can in this case comprise maintaining the constant values of the second upper current threshold value and/or of the second lower current threshold value at the changed value until the calculated phase shift has reached a predefinable target shift. Owing to this temporary change in the current threshold values or at least one of the current threshold values, a temporary change in the switching frequency of the second actuation signal is achieved, with the result that the phase shift between the first and the second actuation signal continuously rises or falls over time. Once the phase shift has then reached the desired ideal value again, the current threshold values can be returned to the starting state again, that is to say the switching frequency of the second actuation signal can be matched to the switching frequency of the first actuation signal, with the result that the actuation of the DC-to-DC voltage converter can take place and be maintained in an ideal interleaved mode.

The method 50 enables reliable and permanent control of the actuation of a polyphase DC-to-DC voltage converter with respect to an optimum phase-shift interleaved actuation which can minimize the voltage ripple and current ripple of the DC-to-DC voltage converter.

The invention claimed is:

1. A control device for controlling a polyphase DC-to-DC voltage converter (10) which has a first converter branch (11) and a second converter branch (12) connected in parallel with the first converter branch (11), the control device comprising:

a switching signal generator (3) configured to calculate measured values for current in the converter branches (11; 12), compare, for the first converter branch (11), the calculated measured value ($M_1$) of the current ($I_1$) in the first converter branch (11) to a first upper current threshold value ($L_{o1}$) and a first lower current threshold value ($L_{u1}$) and to generate, on the basis of the comparison, a first actuation signal ($S_1$) for switching devices (41; 42) of the first converter branch (11), and compare, for the second converter branch (12), the calculated measured value ($M_2$) of the current ($I_2$) in the second converter branch (12) to a second upper current threshold value ($L_{o2}$) and a second lower current threshold value ($L_{u2}$) and to generate, on the basis of the comparison, a second actuation signal ($S_2$) for switching devices (41; 42) of the second converter branch (12); and a threshold-value generator (2) coupled to the switching signal generator (3) and configured to generate upper and lower current threshold values ($L_{o1}$, $L_{u1}$; $L_{o2}$, $L_{u2}$) for the switching signal generator (3), calculate a present phase shift (dT) of the actuation signals ($S_1$; $S_2$) for the switching devices (41; 42) in the first and second converter branches (11; 12), and temporarily change the second upper current threshold value ($L_{o2}$) and/or the second lower current threshold value ($L_{u2}$) on the basis of the calculated phase shift (dT);

wherein the upper and lower current threshold values ($L_{o1}$, $L_{u1}$; $L_{o2}$, $L_{u2}$) have constant predefinable values, and wherein the threshold value generator (2) is designed to keep the constant values of the second upper current threshold value ($L_{o2}$) and/or of the second lower current threshold value ($L_{u2}$) changed until the calculated phase shift (dT) has reached a predefinable target shift.

2. The control device as claimed in claim 1, further comprising:

a driver (4) coupled to the switching signal generator (3) and designed to generate, on the basis of the first and second actuation signals ($S_1$; $S_2$), driver signals ($G_1$; $G_2$) for the switching devices (41; 42) of the first and second converter branches (11; 12).

3. The control device as claimed in claim 1, wherein the first and second converter branches (11; 12) comprise boost converters, buck converters, synchronous converters, buck-boost converters, SEPIC converters, Ćuk converters or zeta converters.

4. The control device as claimed in claim 1, wherein the switching signal generator (3) has:

first and second logic comparators (31, 32; 34, 35) which are designed to compare the measured values ($M_1$; $M_2$) of the current ($I_1$; $I_2$) in the converter branches (11; 12) with the upper and lower threshold value signals ($L_{o1}$, $L_{u1}$; $L_{o2}$, $L_{u2}$) and to output corresponding comparison signals; and first and second flip-flops (33; 36) which are coupled to the first and second comparator logic devices (31, 32; 34, 35) and which generate the first and second actuation signals ($S_1$; $S_2$) on the basis of the comparison signals.

5. A DC-to-DC voltage converter system, comprising:

a DC-to-DC voltage converter (10) having a first converter branch (11) and a second converter branch (12) connected in parallel with the first converter branch (11); and a control device as claimed claim 1, which is designed to control the DC-to-DC voltage converter (10).

6. The control device as claimed in claim 4, wherein the threshold value generator (2) has:

a time-shift calculator (22) coupled to the flip-flops (33; 36) and designed to calculate the switching times ($T_1$; $T_2$) of the flip-flops (33; 36) and a phase shift (dT) between the switching times ($T_1$; $T_2$) of the flip-flops (33; 36); and a threshold-value controller (21) which is coupled to the time-shift calculating device (22) and which controls the change in the second upper current threshold value ($L_{o2}$) and/or the second lower current threshold value ($L_{u2}$) on the basis of the calculated phase shift (dT) of the time-shift calculating device (22).

7. The control device as claimed in claim 6, wherein the threshold-value controller (21) is a three-state controller, PI controller, PID controller or a fuzzy controller.

8. A method (50) for controlling a polyphase DC-to-DC voltage converter (10) which has at least one first converter branch (11) and a second converter branch (12) connected in parallel with the first converter branch (11), wherein the method (50) has the following steps:

calculating (51) measured values for current in the converter branches;

generating (52) upper and lower current threshold values;

comparing (53) the calculated measured value of the current in the first converter branch to a first upper current threshold value and a first lower current threshold value;

generating (54), on the basis of the comparison, a first actuation signal for switching devices of the first converter branch;

comparing (55) the calculated measured value of the current in the second converter branch to a second upper current threshold value and a second lower current threshold value;

generating (56), on the basis of the comparison, a second actuation signal for switching devices of the second converter branch;

calculating (57) a present phase shift of the actuation signals for the switching devices in the first and second converter branches; and temporarily changing (58) the second upper current threshold value and/or the second lower current threshold value on the basis of the calculated phase shift;

wherein the upper and lower current threshold values have constant predefinable values, and wherein the temporary change involves keeping the constant values of the second upper current threshold value and/or of the second lower current threshold value at the changed value until the calculated phase shift has reached a predefinable target shift.

* * * * *